US008607127B2

(12) United States Patent
Kovesi et al.

(10) Patent No.: US 8,607,127 B2
(45) Date of Patent: Dec. 10, 2013

(54) TRANSMISSION ERROR DISSIMULATION IN A DIGITAL SIGNAL WITH COMPLEXITY DISTRIBUTION

(75) Inventors: Balazs Kovesi, Lannion (FR); Stéphane Ragot, Lannion (FR)

(73) Assignee: France Telecom, Paris (FR)

( * ) Notice: Subject to any disclaimer, the term of this patent is extended or adjusted under 35 U.S.C. 154(b) by 411 days.

(21) Appl. No.: 12/675,200

(22) PCT Filed: Sep. 19, 2008

(86) PCT No.: PCT/FR2008/051684
§ 371 (c)(1), (2), (4) Date: Mar. 17, 2010

(87) PCT Pub. No.: WO2009/047461
PCT Pub. Date: Apr. 16, 2009

(65) Prior Publication Data

US 2010/0306625 A1 Dec. 2, 2010

(30) Foreign Application Priority Data

Sep. 21, 2007 (FR) ..................................... 07 57750

(51) Int. Cl.
*G06F 11/00* (2006.01)

(52) U.S. Cl.
USPC ......................................................... 714/776

(58) Field of Classification Search
USPC ......................................................... 714/776
See application file for complete search history.

(56) References Cited

U.S. PATENT DOCUMENTS 6,952,668 B1 10/2005 Kapilow
7,596,489 B2 * 9/2009 Kovesi et al. ................. 704/219
7,877,253 B2 * 1/2011 Krishnan et al. .............. 704/225
2004/0010407 A1 * 1/2004 Kovesi et al. ................. 704/219
2004/0120309 A1 * 6/2004 Kurittu et al. ................. 370/352
2006/0171373 A1 8/2006 Li
2009/0103517 A1 * 4/2009 Ohmuro et al. ............... 370/352
2009/0161555 A1 * 6/2009 Chung ....................... 370/241.1
2009/0240490 A1 * 9/2009 Kim et al. ..................... 704/207
2010/0070271 A1 * 3/2010 Kovesi et al. ................. 704/219

FOREIGN PATENT DOCUMENTS

WO WO 02/21515 A1 3/2002

* cited by examiner

*Primary Examiner* — Yair Leibovich
(74) *Attorney, Agent, or Firm* — Drinker Biddle & Reath LLP

(57) ABSTRACT

The present invention relates to a method of transmission error concealment in a digital signal split up into a plurality of successive frames associated with different time intervals in which, on reception, the signal might comprise erased frames and valid frames and in order to replace at least the first erased frame (N) after a valid frame, at least two steps are performed, a first step (E1) of preparation not producing any missing sample and comprising at least one analysis of a valid decoded signal and a second step (E2) of concealment producing the missing samples of the signal corresponding to said erased frame. The first step and the second step are executed in different time intervals.

The invention relates also to a device of concealment implementing the method according to the invention as well as a decoder comprising such a device. The invention allows the distribution of the error concealment complexity on different time intervals.

10 Claims, 7 Drawing Sheets

| | | | | | | | |
|---|---|---|---|---|---|---|---|
| 310 | Frame No. of the frame received and decoded | 2 | 3 | - | 5 | 6 | 7 |
| 311 | Frame No. of the frame in the buffer memory | 1 | 2 | 3 | - | 5 | 6 |
| 312 | Analysis_p1 for the extrapolation of frame No. | - | - | 4 | - | - | - |
| 313 | Analysis_p2 for the extrapolation of frame No. | - | - | - | 4 | - | - |
| 314 | Extrapolation of frame No. | - | - | - | 4 | 5 | - |
| 315 | Cross fade of frame No. | - | - | - | - | 5 | - |
| 316 | Frame No. of the frame sent to the sound card | 1 | 2 | 3 | 4 | 5 | 6 |

Figure 3a

| | | | | | | | | |
|---|---|---|---|---|---|---|---|---|
| 410 | Frame No. of the frame received and decoded | 2 | 3 | - | - | 6 | 7 | 8 |
| 411 | Frame No. of the bufferized frame | 1 | 2 | 3 | - | - | 6 | 7 |
| 412 | Analysis_p1 for the extrapolation of frame No. | - | - | 4 | - | - | - | - |
| 413 | Analysis_p2 for the extrapolation of frame No. | - | - | - | 4 | - | - | - |
| 414 | Extrapolation of frame No. | - | - | - | 4 | 5 | 6 | - |
| 415 | Cross fade of frame No. | - | - | - | - | - | 6 | - |
| 416 | Frame No. of the frame sent to the sound card | 1 | 2 | 3 | 4 | 5 | 6 | 7 |

Figure 3b

TRANSMISSION ERROR DISSIMULATION IN A DIGITAL SIGNAL WITH COMPLEXITY DISTRIBUTION

CROSS-REFERENCE TO RELATED APPLICATIONS

This application is the U.S. national phase of the International Patent Application No. PCT/FR2008/051684 filed Sep. 19, 2008, which claims the benefit of French Application No. 07 57750 filed Sep. 21, 2007, the entire content of which is incorporated herein by reference.

FIELD OF THE INVENTION

The present invention relates to the processing of digital signals in the field of telecommunications. These signals may for example be speech signals, music signals, video signals or more generally multimedia signals.

The present invention intervenes in a coding/decoding system adapted for the transmission/reception of such signals. More particularly, the present invention pertains to a processing upon reception making it possible to improve the quality of the decoded signals in the presence of losses of data blocks.

BACKGROUND

Various techniques exist for converting an audiodigital signal into digital form and compressing it. The commonest techniques are:

waveform coding schemes, such as PCM (for "Pulse Code Modulation") coding and ADPCM (for "Adaptive Differential Pulse Code Modulation") coding, parametric coding schemes based on analysis by synthesis such as CELP (for "Code Excited Linear Prediction") coding, and sub-band or transform-based perceptual coding schemes.

These techniques process the input signal in a sequential manner sample by sample (PCM or ADPCM) or in blocks of samples termed "frames" (CELP and transform coding). For all these coders, the coded values are thereafter transformed into a binary train which is transmitted on a transmission channel.

Depending on the quality of this channel and the type of transport, disturbances may affect the signal transmitted and produce errors in the binary train received by the decoder. These errors may arise in an isolated manner in the binary train but very frequently occur in bursts. It is then a packet of bits corresponding to a complete signal portion which is erroneous or not received. This type of problem is encountered for example with transmissions over mobile networks. It is also encountered in transmissions over packet networks and in particular over networks of Internet type.

When the transmission system or the modules responsible for reception make it possible to detect that the data received are highly erroneous (for example on mobile networks), or that a block of data has not been received or is corrupted by binary errors (case of packet transmission systems for example), procedures for concealing the errors are then implemented.

The current frame to be decoded is then declared erased ("bad frame"). These procedures make it possible to extrapolate at the decoder the samples of the missing signal on the basis of the signals and data emanating from the previous frames.

Such techniques have been implemented mainly in the case of parametric and predictive coders (techniques of recovery/concealment of erased frames). They make it possible to greatly limit the subjective degradation of the signal perceived at the decoder in the presence of erased frames. These algorithms rely on the technique used for the coder and the decoder, and in fact constitute an extension of the decoder. The objective of devices for concealing erased frames is to extrapolate the parameters of the erased frame on the basis of the last previous frame(s) considered to be valid.

Certain parameters manipulated or coded by predictive coders exhibit a high inter-frame correlation (case of LPC (for "Linear Predictive Coding") parameters which represent the spectral envelope, and LTP (for "Long Term Prediction") parameters which represents the periodicity of the signal (for the voiced sounds, for example). On account of this correlation, it is much more advantageous to reuse the parameters of the last valid frame to synthesize the erased frame than to use erroneous or random parameters.

In CELP excitation generation, the parameters of the erased frame are conventionally obtained as follows.

The LPC parameters of a frame to be reconstructed are obtained on the basis of the LPC parameters of the last valid frame, by simply copying the parameters or else by introducing a certain damping (technique used for example in the G723.1 standardized coder). Thereafter, a voicing or a non-voicing in the speech signal is detected so as to determine a degree of harmonicity of the signal at the erased frame level.

If the signal is unvoiced, an excitation signal can be generated in a random manner (by drawing a code word from the past excitation, by slight damping of the gain of the past excitation, by random selection from the past excitation, or also using transmitted codes which may be totally erroneous).

If the signal is voiced, the pitch period (also called "LTP lag") is generally that calculated for the previous frame, optionally with a slight "jitter" (increase in the value of the LTP lag for consecutive error frames, the LTP gain being taken very near 1 or equal to 1). The excitation signal is therefore limited to the long-term prediction performed on the basis of a past excitation.

The complexity of calculating this type of extrapolation of erased frames is generally comparable with that of a decoding of a valid frame (or "good frame"): the parameters estimated on the basis of the past, and optionally slightly modified, are used in place of the decoding and inverse quantization of the parameters, and then the reconstructed signal is synthesized in the same manner as for a valid frame using the parameters thus obtained.

Other types of coding do not allow the extrapolation of an erased frame by extension of the decoder using the parameters estimated on the basis of the past. This is the case for example for the PCM temporal coding which codes the signal sample by sample, without resorting to a speech prediction model. No parameter is directly available to the decoder for performing the extrapolation.

To extrapolate the erased frames with the same performance as in the case of parametric coders the algorithm for dissimilating erased frames must therefore firstly estimate the extrapolation parameters by itself on the basis of the past decoded signal. This typically requires short-term (LPC) and long-term (LTP) correlation analyses and optionally the classification of the signal (voiced, unvoiced, plosive, etc.) thereby considerably increasing the calculation load. These analyses are for example described in the document entitled "Method of packet errors cancellation suitable for any speech and sound compression scheme" by B. KOVESI and D. Massaloux, ISIVC-2004, International Symposium on Image/Video Communications over fixed and mobile networks, July 2004. According to this technique described, the method for concealing an erased frame therefore consists of a first analysis part and a second extrapolation part producing missing samples of the signal corresponding to the erased frame.

However, for consecutive erasures these analyses have to be done only once, during the first erased frame, and then the parameters thus estimated (optionally slightly attenuated according to the length of the erasure) are used throughout the duration of the extrapolation.

Stated otherwise this increase in calculation load due to the analyses of the past signal is the same as the erased frame i.e. 5 ms or 40 ms.

However, to dimension the hardware platform—for example a processor of DSP type (for "Digital Signal Processor")—the most unfavorable case is taken into account, that is to say maximum complexity. This worst case of complexity therefore arises in the case of short frames.

Indeed the analyses of the past signal (LPC, LTP, classification) require a given number of operations per frame, independently of the frame size. The complexity of these analyses is measured in terms of number of operations per second. This complexity therefore increases the shorter the frame length, since the number of operations per second is given by the number of operations per frame divided by the frame length—the number of operations per second is therefore inversely proportional to the frame length.

The mean complexity is also a significant parameter since it influences the energy consumption of the processor and thus the duration of autonomy of the battery of the equipment in which it is situated, such as for example a mobile terminal.

In certain cases, this calculation load remains reasonable and comparable with the calculation load of the normal decoding. For example in the case of the G.722 standardized coder, an algorithm for concealing erased frames of low complexity has been standardized in accordance with ITU-T recommendation G.722 appendix IV. The complexity of calculating the extrapolation of an erased frame of 10 ms is in this case 3 WMOPS (for "Weighted Million Operations Per Second"), this being substantially identical to the complexity of the decoding of a valid frame.

This no longer holds if the G722 coder processes shorter frames, of 5 ms for example.

Moreover, the complexity of such an algorithm for dissimilating erased frames may be penalizing in the case of coders of very low complexity such as the coder standardized in accordance with ITU-T recommendation G.711 (PCM) and these extensions such as the G.711 WB coder undergoing standardization for in particular the decoding of the low band, sampled at 8 kHz and coded by a G.711 coder followed by an improvement layer.

Indeed, the complexity of PCM coding/decoding is of the order 0.3 WMOPS, whereas that of an efficacious algorithm for dissimilating erased frames is typically of the order of 3 WMOPS based on 10-ms frames.

SUMMARY

The present invention intends to improve the situation.

It proposes for this purpose a method of transmission error concealment in a digital signal split up into a plurality of successive frames associated with different time intervals in which, on reception the signal might comprise erased frames and valid frames and in order to replace at least the first erased frame after a valid frame, at least two steps are performed, a first step of preparation not producing any missing sample and comprising at least one analysis of a valid decoded signal and a second step of concealment producing the missing samples of the signal corresponding to said erased frame. The method is such that the first step and the second step are executed in different time intervals.

Thus, the steps constituting the process for concealing erased frames being performed over different time intervals, this makes it possible to distribute the calculation load and thus to decrease the complexity, in particular the worst case of complexity. The worst case of complexity being decreased, the dimensioning of the processor can then also be revised downward.

The expression preparation step is understood to mean operations specific to concealment, which would not be necessary if decoding solely valid frames.

In the state of the art, for example in CELP decoding, parameters decoded in the previous valid frames are used for loss concealment. According to the invention, such parameters are not transmitted to the decoder and must be estimated by analysis so as to synthesize the missing signal during the concealment of losses.

In a first embodiment, the preparation step is performed in the time interval associated with a valid frame and the concealment step is performed in the time interval associated with an erased frame.

The preparation step being performed before the time interval corresponding to an erased frame, the second step no longer requires as significant a complexity during the time interval corresponding to the erased frame, thereby decreasing in this interval, the complexity. It is generally during this interval that the worst case of complexity is measured. The latter is thus decreased in this embodiment.

In a second embodiment, the preparation step is performed in the time interval associated with an erased frame and the concealment step is performed in a following time interval.

The first step is here no longer executed systematically during the receipt of a valid frame but on receipt of an erased frame. Thus the worst case of complexity is therefore reduced with respect to the first embodiment by distributing the calculation load, as is also the mean complexity.

In an advantageous manner, the second embodiment of the method according to the invention is such that it is implemented during the decoding of a first frequency band in a decoding system comprising a decoding in a first frequency band and a decoding in a second frequency band, the decoding in the second frequency band comprising a temporal delay with respect to the decoding in the first frequency band.

Thus, the delay introduced by the execution of the second step over the following time interval is transparent for this type of decoding which already possesses a temporal delay between the decoding of the first frequency band and the second frequency band.

The invention is particularly adapted in the case where the first frequency band corresponds to the low band of a decoding of G.711WB type and the second frequency band corresponds to the high band of a decoding of G.711WB type, the delay of the signal arising from the concealment step corresponding to the delay of decoding the high band with respect to the low band.

In a particular embodiment, the preparation step comprises an LPC analysis step, an LTP analysis step and the concealment step comprises a step of calculating an LPC residual signal, a step of ranking and a step of extrapolating missing samples.

In another particular embodiment, the preparation step comprises an LPC analysis step, an LTP analysis step, a step of calculating an LPC residual signal and the concealment step comprises a step of ranking and a step of extrapolating missing samples.

The present invention also relates to a device for transmission error concealment in a digital signal split up into a plurality of successive frames associated with different time intervals comprising preparation means not producing any missing sample and comprising at least means for analyzing a valid decoded signal and concealment means producing the missing samples of the signal corresponding to an erased frame. The device is such that said means are implemented in different time intervals so as to replace at least the first erased frame after a valid frame.

It is also aimed at a digital signal decoder comprising a transmission error concealment device according to the invention.

Finally, the invention pertains to a computer program intended to be stored in a memory of a transmission error concealment device. This computer program is such that it comprises code instructions for implementing the steps of the error concealment method according to the invention, when it is executed by a processor of said transmission error concealment device.

BRIEF DESCRIPTION OF THE DRAWINGS

Other advantages and characteristics of the invention will become apparent on examining the detailed description, given by way of example hereinafter, and the appended drawings in which:

FIGS. 3*a* and 3*b* illustrate in the form of tables examples of the second embodiment of the invention;

DETAILED DESCRIPTION

Figure 1:
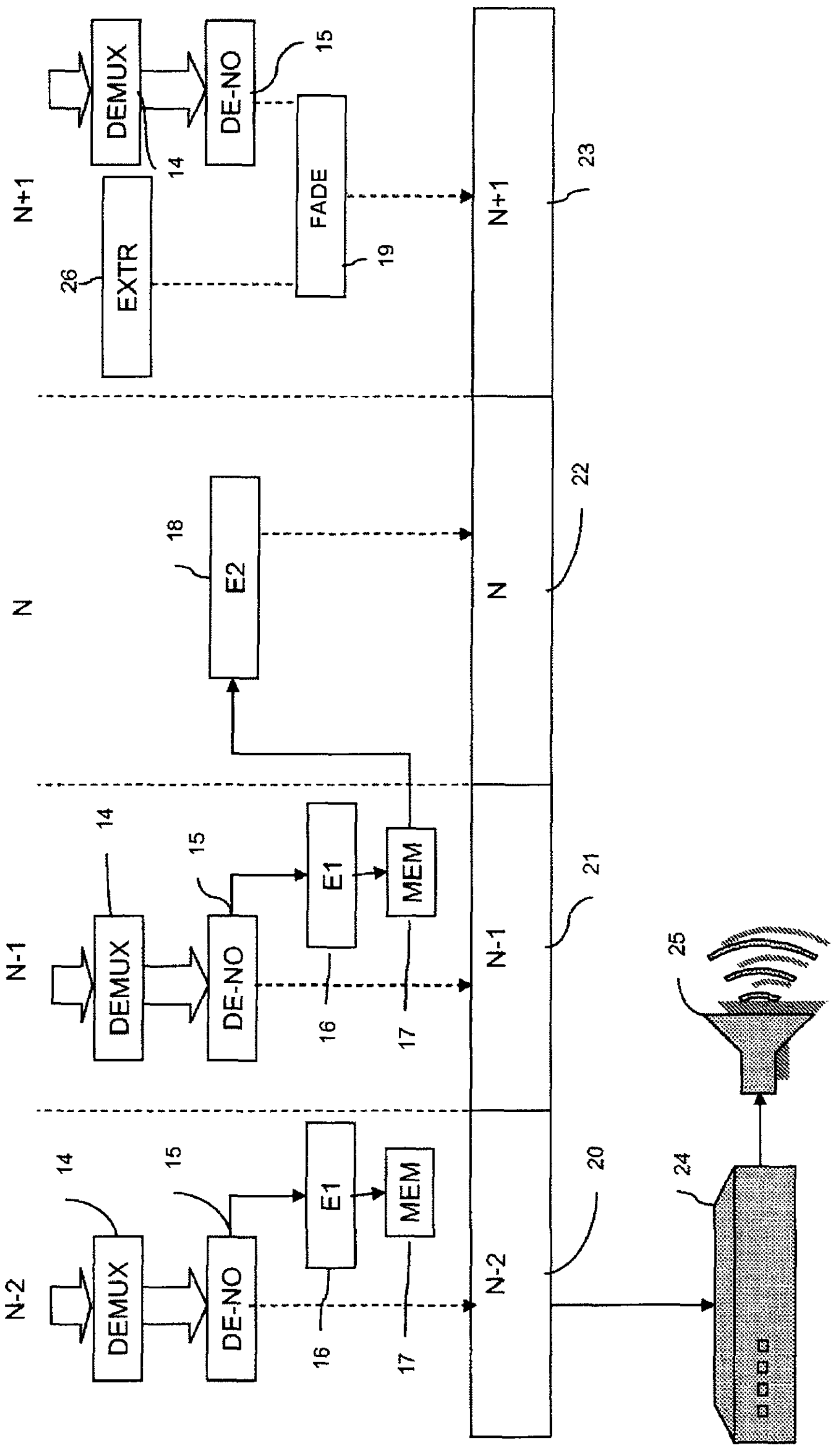
FIG. 1 illustrates the concealment method according to the invention in a first embodiment.

In G.711 standardized coders for example, the erased frame concealment scheme described in the document "Method of packet errors cancellation suitable for any speech and sound compression scheme" by B. KOVESI and D. Massaloux, ISIVC-2004, International Symposium on Image/Video Communications over fixed and mobile networks, July 2004 is carried out as follows.

Upon detection of a first erased frame (lost or erroneous) the module for dissimilating erased frames analyses the past stored signal and then synthesizes (or extrapolates) the missing frame using the estimated parameters.

If the loss of a consecutive frame is detected, the module for dissimilating erased frames continues to synthesize the missing signal using the same parameters, optionally slightly attenuated, as in the extrapolated previous frame.

Upon receipt of a first valid frame after an erasure, continuity between the signal extrapolated during the erasure and the valid decoded signal is ensured by a simple and effective means of smoothing or else of "crossfading". This crossfading is carried out in the following manner: for a predetermined length of typically 5-10 ms, the extrapolated signal continues to be synthesized in parallel with the decoding of the signal in the valid frame. The output signal is then the weighted sum of these two signals by progressively decreasing the weight of the extrapolated signal and by increasing at the same time the weight of the valid signal.

For illustrative purposes, let us assume the following complexity figures:

- coding of a frame→0.15 WMOPS,
- decoding of a frame→0.15 WMOPS,
- analyses (LPC, LTP, classification) at the start of erasure 2.5 WMOPS,
- extrapolation of a frame using the parameters estimated by the analyses 0.5 WMOPS,
- crossfading between the extrapolated signal and the first decoded frame after an erasure→0.05 WMOPS.

Table 1 below illustrates the evolution of the complexity of such a coder in the case where a single frame (No. 3) is erased.

TABLE 1

Example of evolution of complexity in the case of an erased frame

| Frame number | 1 | 2 | 3 | 4 | 5 | 6 |
|---|---|---|---|---|---|---|
| Nature of the frame | valid | valid | erased | valid | valid | valid |
| encoding (0.15 WMOPS) | 1 | 1 | 1 | 1 | 1 | 1 |
| decoding (0.15 WMOPS) | 1 | 1 | 0 | 1 | 1 | 1 |
| analysis (2.5 WMOPS) | 0 | 0 | 1 | 0 | 0 | 0 |
| extrapolation (0.5 WMOPS) | 0 | 0 | 1 | 1 | 0 | 0 |
| crossfading (0.05 WMOPS) | 0 | 0 | 0 | 1 | 0 | 0 |
| total complexity (WMOPS) | 0.3 | 0.3 | 3.15 | 0.85 | 0.3 | 0.3 |

It is thus possible to observe the complexity peak (3.15 WMOPS) that the DSP must be able to support, during the period of the erased frame. This complexity peak is essentially due to the fact that the whole of the method for concealing the erased frame (analysis part and extrapolation part) is executed for the duration of the erased frame.

The mean complexity for these six frames is 0.87 WMOPS. In the same manner, Table 2 below illustrates the case of 2 consecutive erased frames (No. 3 and No. 4).

TABLE 2

Example of evolution of complexity in the case of two erased frames

| Frame number | 1 | 2 | 3 | 4 | 5 | 6 |
|---|---|---|---|---|---|---|
| Nature of the frame | valid | valid | erased | erased | valid | valid |
| encoding (0.15 WMOPS) | 1 | 1 | 1 | 1 | 1 | 1 |
| decoding (0.15 WMOPS) | 1 | 1 | 0 | 0 | 1 | 1 |
| Analysis (2.5 WMOPS) | 0 | 0 | 1 | 0 | 0 | 0 |
| extrapolation (0.5 WMOPS) | 0 | 0 | 1 | 1 | 1 | 0 |
| crossfading (0.05 WMOPS) | 0 | 0 | 0 | 0 | 1 | 0 |
| total complexity (WMOPS) | 0.3 | 0.3 | 3.15 | 0.65 | 0.85 | 0.3 |

It is still possible to observe the complexity peak (3.15 WMOPS) for the duration of the first frame erased since, once again, the whole of the method for concealing the erased frame (analysis part and extrapolation part) is executed for the duration of a frame, that of the first erased frame. On the other hand the complexity for the following erased frames is markedly lower and the mean complexity for these six frames is 0.925 WMOPS, barely higher than in the case of a single erased frame. The increase in the duration of erasure does not significantly increase the complexity.

Thus, in this type of coder/decoder of the state of the art, for each frame received at the decoder, a variable bfi (for "bad frame indicator") indicates that the current frame is erased (bfi=1) and makes it possible to select the type of decoding, normal decoding or concealment of erased frames. Thus, if the frame is valid (bfi=0), a normal decoding is undertaken (with complexity 0.15 WMOPS), otherwise (bfi=1), the erased frame concealment (with complexity 3 WMOPS) makes it possible to extrapolate the missing frame on the basis of the past signal. This process is repeated at each frame.

The present invention is aimed at reducing this complexity by distributing the steps of concealing erased frames over the duration of several frames.

Thus, FIG. 1 illustrates a first embodiment of the invention. To replace at least the first erased frame after a valid frame, the concealment method according to the invention comprises at least two steps, a first step (E1) of preparation not producing any missing sample, a second step (E2) of concealment which comprises the production of missing samples of the signal corresponding to the erased frame. It is pointed out that the expression preparation step is understood to mean operations specific to concealment, which would not be necessary if decoding solely valid frames.

These two steps E1 and E2 are performed in different time intervals associated with the successive frames received at the decoder. FIG. 1 shows an exemplary embodiment in the case where frame N, received at the decoder, is erased.

Thus, in this embodiment, a first frame N−2 received in a binary train originating from the communication channel, is processed by a demultiplexing module (DEMUR) 14 and is then decoded by a normal decoding module (DE-NO) 15.

This decoded signal constitutes frame N−2 referenced 20 as decoder output dispatched for example to the sound card 24. It is also provided as input to a preparation module 16 implementing the first step E1 of preparation. The result of this step is thereafter stored at 17 (MEM).

This same process of demultiplexing, normal decoding, construction of frame N−1 referenced 21 at the decoder output, and storage of the result of the first step is also performed for the valid frame N−1.

In this embodiment, the preparation step is performed for all the valid frames in anticipation of a potential erased frame.

When an erased frame N referenced 12 is received at the decoder the second step E2 of concealment is performed by taking into account at least one result stored in the previous frames. This second concealment step generates missing samples so as to construct frame N referenced 22 at the output of the decoder.

When a valid frame N+1 is received at the input of the decoder, it undergoes a step of demultiplexing, of normal decoding like all the valid frames but also a step of "crossfading" FADE referenced 19 which will make it possible to smooth the decoded signal between the reconstructed signal for frame N and the decoded signal for frame N+1. This crossfade step consists in continuing in parallel with the normal decoding, the extrapolation EXTR referenced 26 of the missing samples of step E2. The output signal is then the weighted sum of these two signals by progressively decreasing the weight of the extrapolated signal and by increasing at the same time the weight of the valid signal.

The signal obtained at the output of the decoder is thereafter for example provided to a sound card 24 so as thereafter to be played back for example with the aid of loudspeakers 25.

Thus, by systematically performing the preparation step after the decoding of a valid frame, it becomes possible to reduce the worst case of complexity in the time interval corresponding to the erased frame N.

In the case where a frame is erased, part of the operations is already done, only the concealment step E2 producing the missing samples of the signal corresponding to the erased frame is executed for the duration of the frame. The calculation load for this frame is therefore decreased.

The preparation step E1 can for example contain a first part of the analysis such as for example the LPC analysis and the LTP analysis. These analysis steps are in particular detailed in the document "Method of packet errors cancellation suitable for any speech and sound compression scheme" cited previously.

The concealment step E2 then contains a step of calculating the LPC residual signal (used in the extrapolation phase), of classifying the signal and of extrapolating the missing samples (generating the excitation signal on the basis of the residual signal and synthesis filtering).

In another variant embodiment, step E1 can contain at one and the same time the LPC, LTP analyses and the calculation of the LPC residual signal, step E2 then containing the classification and extrapolation step.

The order of execution of the various concealment tasks is not unique.

Very obviously it is necessary to comply with a few constraints such as the fact that the classification and extrapolation steps are the last operations and that the LPC analysis precedes the calculation of the LPC residual signal.

A few examples of orders of operations that are possible are:

- LPC Analysis, LTP analysis, calculation of the LPC residual signal, classification and extrapolation;
- LTP Analysis, LPC analysis, calculation of the LPC residual signal, classification and extrapolation;
- LPC Analysis, calculation of the LPC residual signal, LTP analysis, classification and extrapolation.

The distribution of the various tasks can thus be modulated in various ways and is not limited to the examples cited above.

Moreover the operations of a task can be executed in several stages. For example in another variant embodiment, step E1 can contain at one and the same time the LPC analysis, the calculation of the LPC residual signal and the first part of the LTP analysis, step E2 then containing the second part of the LTP analysis, the classification and the extrapolation.

This shows that it is possible to distribute the complexity of analysis calculation freely between steps E1 and E2 so as to be able to decrease to the maximum the worst case of complexity. The optimal distribution depends on the complexity of the other decoding calculations.

Table 3 below illustrates a numerical example where the first analysis part (analysis_p1) has a complexity of 1.15 WMOPS, the second analysis part (analysis_p2) has a complexity of 1.35 WMOPS, the preparation step E1 containing the first analysis part (analysis_p1) and the concealment step E2 containing the second analysis part (analysis_p2) and the extrapolation (extrapolation).

This table deals with the case where two consecutive frames are erased. Note that for the second erased frame only the "extrapolation" step is necessary since the parameters produced by the analysis steps (analysis p1 and p2) are reused. In certain realizations these parameters may be slightly modified (attenuated). This operation of attenuating the parameters is optional and is inexpensive in terms of calculation load, this is why it is ignored in the examples given.

TABLE 3

Example of evolution of complexity in the case of 2 erased frames with analysis in two parts

| Frame number | 1 | 2 | 3 | 4 | 5 | 6 |
|---|---|---|---|---|---|---|
| Nature of the frame | valid | valid | erased | erased | valid | valid |
| encoding (0.15 WMOPS) | 1 | 1 | 1 | 1 | 1 | 1 |
| decoding (0.15 WMOPS) | 1 | 1 | 0 | 0 | 1 | 1 |
| Analysis_p1 (1.15 WMOPS) | 1 | 1 | 0 | 0 | 1 | 1 |
| Analysis_p2 (1.35 WMOPS) | 0 | 0 | 1 | 0 | 0 | 0 |
| extrapolation (0.5 WMOPS) | 0 | 0 | 1 | 1 | 1 | 0 |
| crossfading (0.05 WMOPS) | 0 | 0 | 0 | 0 | 1 | 0 |
| total complexity (WMOPS) | 1.45 | 1.45 | 2.0 | 0.65 | 2.0 | 1.45 |

It is possible to observe that the worst case of complexity is markedly decreased with respect to the case presented in table 2 above, it goes from 3.15 WMOPS to 2.0 WMOPS. This is obtained without additional delay, as may be seen in FIG. 1.

However, the complexity of processing a valid frame is increased from 0.3 WMOPS to 1.45 WMOPS with respect to the case presented in table 2 above. In the absence of any transmission error the mean complexity is therefore multiplied by almost 5 thereby increasing the consumption of the DSP and decreasing its autonomy in the case where a battery is used.

A second embodiment of the invention offers a solution which decreases at one and the same time the worst case of complexity without increasing the mean complexity. Thus, with reference to FIG. 2, a second embodiment is illustrated in the case where frame N referenced 31 received at the decoder is erased.

In this example, the preparation step E1 is executed only in the case where a frame is erased and no longer systematically at each valid frame. The preparation step is thus performed in the time interval corresponding to the erased frame N. The signal at the output of the decoder therefore has a temporal delay corresponding to a time interval of a frame.

Figure 2:
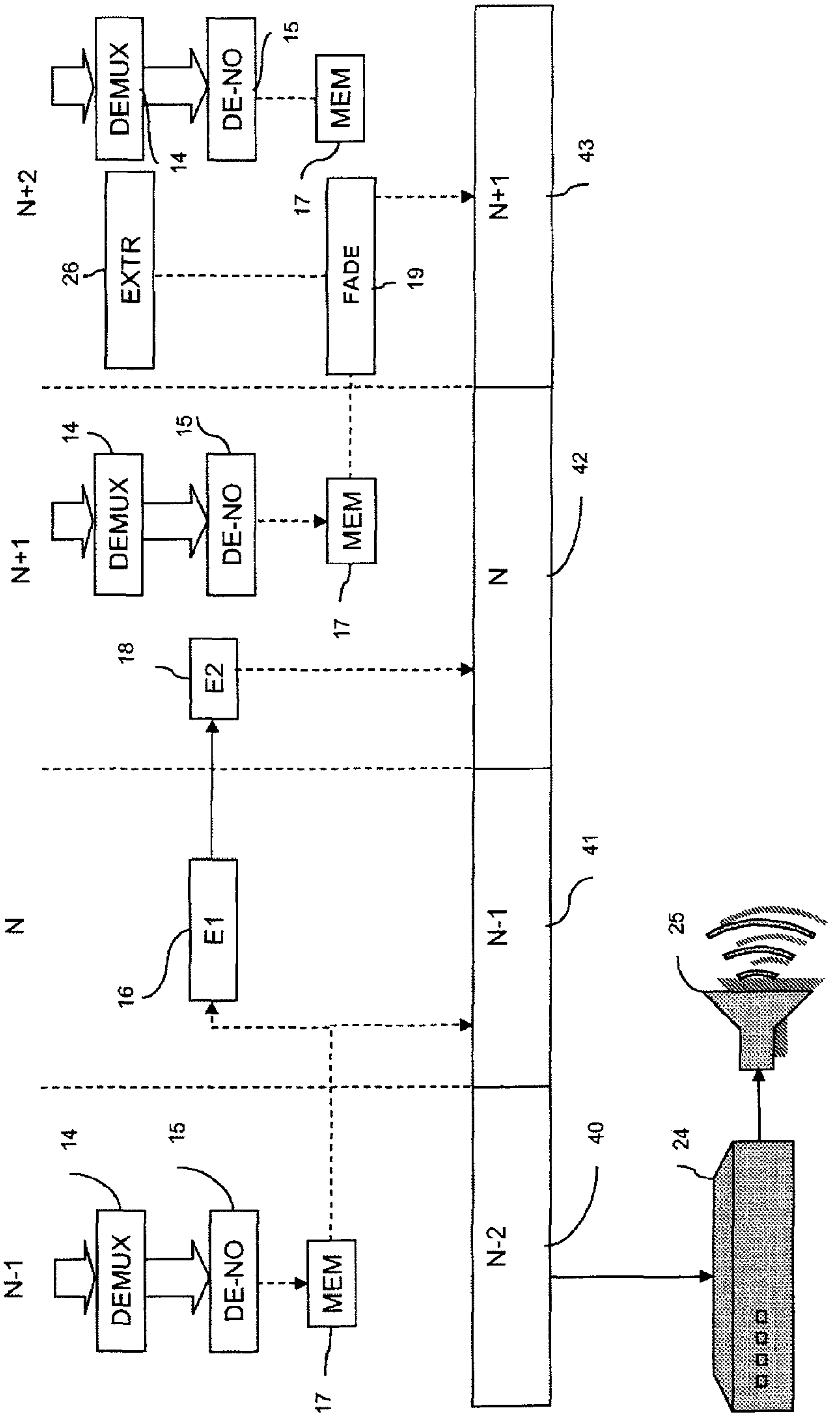
FIG. 2 illustrates the concealment method according to the invention in a second embodiment.

Thus, as illustrated in FIG. 2, for a valid frame N−1 referenced 30 received at the decoder, said frame is processed by the demultiplexing module DEMUX 14, is decoded normally at 15 and the decoded signal is stored at MEM 17 in a buffer memory. This stored decoded signal is dispatched to the sound card 24 at the output of the decoder after the decoding of frame N referenced 31 received.

Thus, upon detection of the erased frame N, the duration of two frames is employed to extrapolate the signal replacing this frame N. During the time interval corresponding to the erased frame N, the preparation step E1 is performed on the decoded and stored signal corresponding to frame N−1 received. The concealment step E2 comprising the extrapolation of the missing samples corresponding to frame N is carried out in the time interval corresponding to frame N+1, received at the decoder.

During this time interval, frame N+1 is also processed by the demultiplexing module, decoded and stored so as to be used thereafter in the time interval corresponding to frame N+2 during the FADE crossfade step 19.

The resulting frame N+1 is dispatched to the sound card at 43. A temporal shift corresponding in this exemplary embodiment to a frame is therefore introduced at the output of the decoder. This is in general acceptable in the case for example of a coder/decoder of G.711 type which has a very small delay. An illustration in table form of this second embodiment is also depicted in FIG. 3*a* and FIG. 3*b*.

FIG. 3*a* shows an example where frame No. 4 is erased. The first row 310 shows the frame numbers of the frames received at the decoder. The second row 311 shows the frame number of the decoded frame in buffer memory.

Upon detection of the loss of frame No. 4 the preparation step is performed beginning the analysis (analysis_p1) on the decoded past frames (No. 1-No. 3) as shown by row 312. At the end of frame No. 4, frame No. 3 stored previously is dispatched to the sound card as illustrated in row 316. For the following frame the buffer memory is empty but the second part of the analysis (analysis_p2) in row 313 and the synthesis of the extrapolation of frame No. 4 in row 314 are terminated. Extrapolated frame No. 4 can be dispatched to the sound card. At the same time the decoding of frame No. 5 is done and the result is stored as illustrated in row 311. For the following frame, frame No. 5 is extrapolated (row 314) for the crossfade with stored frame No. 5 (row 315). The result of this crossfade is dispatched to the sound card (row 316). Thereafter frame No. 6 is decoded and stored.

The table represented in FIG. 3*b*, illustrates the case where frame No. 4 and frame No. 5 are erased at one and the same time. The frames received at the decoder are illustrated in row 410. In the same manner as for FIG. 3*a*, row 411 represents the frames decoded and stored in the buffer memory.

The first preparation step (analysis_p1) is performed in the time interval of the first erased frame (row 412). The second part of the analysis (analysis_p2) is performed in the following time interval, that is to say here in the interval corresponding to the second erased frame (row 413).

The extrapolation of the missing samples is performed in the time interval corresponding to the second erased frame and also for the following two frames (row 414) in the following time intervals so as to be able to execute the crossfade (row 415) on the valid frame 6. Thereafter frame No. 7 is decoded and stored.

Row 416 shows the frame numbers of the output frames from the decoder with a temporal shift of a frame with respect to the signal received at the decoder.

Table 4 below illustrates the evolution of the complexity corresponding to the typical case of FIG. 3*a*. This time the optimal result (the lowest maximum complexity) is obtained by dividing the analysis as follows:

part 1→1.6 WMOPS, part 2→0.9 WMOPS.

TABLE 4

Example of evolution of complexity in the case of a stored frame, with an erased frame

| Frame number | 2 | 3 | 4 | 5 | 6 | 7 |
|---|---|---|---|---|---|---|
| Nature of the frame | valid | valid | erased | valid | valid | valid |
| encoding (0.15 WMOPS) | 1 | 1 | 1 | 1 | 1 | 1 |
| decoding (0.15 WMOPS) | 1 | 1 | 0 | 1 | 1 | 1 |
| analysis_p1 (1.6 WMOPS) | 0 | 0 | 1 | 0 | 0 | 0 |
| analysis_p2 (0.9 WMOPS) | 0 | 0 | 0 | 1 | 0 | 0 |
| extrapolation (0.5 WMOPS) | 0 | 0 | 0 | 1 | 1 | 0 |
| crossfading (0.05 WMOPS) | 0 | 0 | 0 | 0 | 1 | 0 |
| total complexity (WMOPS) | 0.3 | 0.3 | 1.75 | 1.7 | 0.85 | 0.3 |

A decrease is thus observed in the maximum complexity as compared with the solution presented in table 3 above. With respect to the state of the art presented in table 1, the maximum complexity is practically halved while the mean complexity is unchanged (0.87 WMOPS). It is noted moreover that this solution does not increase the complexity of decoding a valid frame received.

It is noted however that in this typical case, a delay in the decoded signal is introduced with respect to the signal received at the decoder.

The examples given above were taken with the transmission error concealment process split into two steps. Very obviously the procedure which is the subject of the present invention is easily generalizable for a splitting into three or indeed more steps. Such a split may also be advantageous in certain cases, when the gap between the complexity of the normal decoding and that of the algorithm for concealing erased frames is very large. In this case it is possible to distribute the complexity of the algorithm for concealing erased frames over three or more frames. The various steps being executed over different time intervals.

The second embodiment thus described is particularly beneficial when it is implemented in certain decoders such as for example in the G.711WB decoder (for G711—WideB and) currently undergoing standardization.

Figure 4:
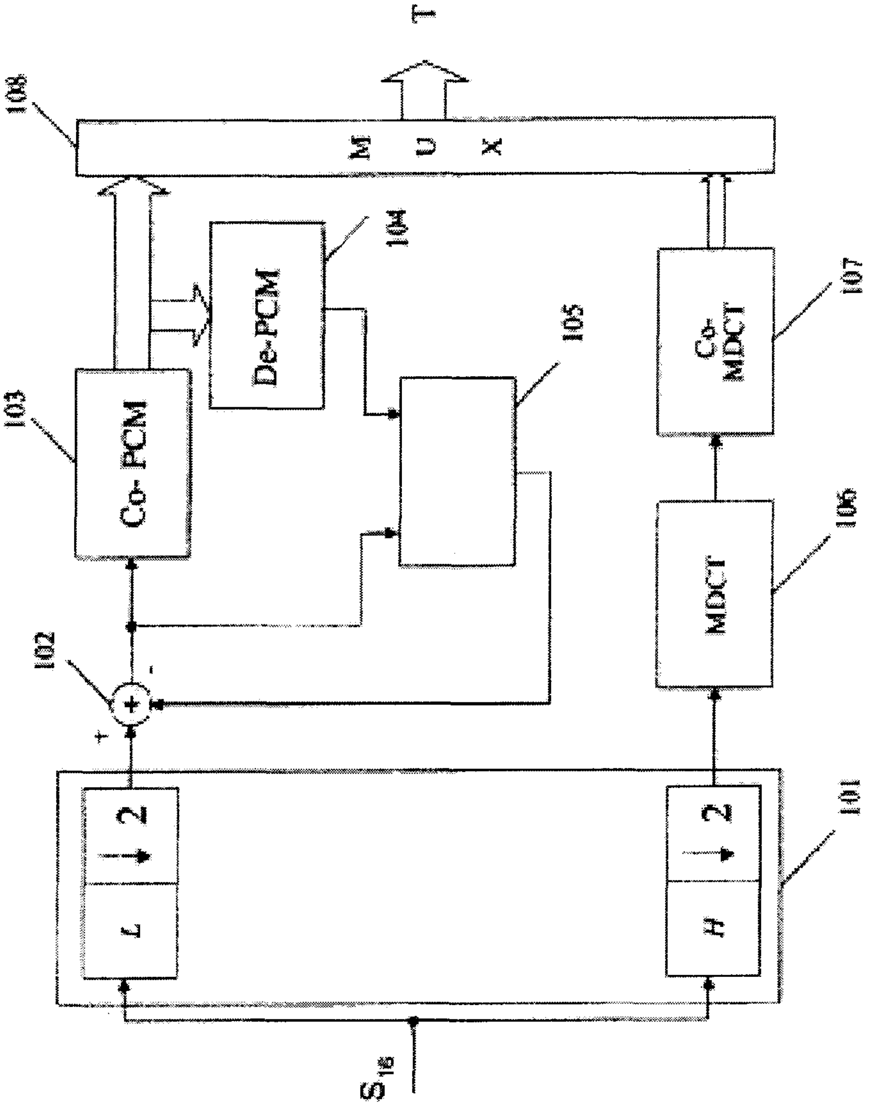
FIG. 4 illustrates a coder of G.711 WB type which can be used within the framework of the invention.

We shall describe with reference to FIG. 4, a coder of G.711WB type. G.711WB coding consists in adding up to 2 improvement layers of 16 kbit/s to the layer termed the G.711 "core layer" of 64 kbit/s. The possible configurations of binary train—termed Rx where x identifies the rates are:

Rate of 64 kbit/s (R1): G.711 data solely

Rate of 80 kbits (64+16 kbit/s) (R2*a*): G.711 data and data for improving quality in the 50-4000 Hz band.

Rate of 80 kbits (64+16 kbit/s) (R2*b*): G.711 data and data for extending the band of G.711 for the 4000-7000 Hz part.

Rate of 96 kbit/s (64+16+16 kbit/s) (R3): G.711 data, data for improving quality in the 50-4000 Hz band, data for extending the band of G.711 for the 4000-7000 Hz part.

Thus rates R1 and R2*a* lead to a narrow-band reconstruction (50-4000 Hz) whereas rates R2*b* and R3 lead to a wide-band reconstruction (50-7000 Hz). A proprietary coder similar to G.711WB is described in the document Y. Hiwasaki and H. Ohmuro and T. Mori and S. Kurihara and A. Kataoka, "A G.711 Embedded Wideband Speech Coding for VoIP Conferences", IEICE Transactions on Information and Systems, vol. E89-D, No. 9, September 2006, pp. 2542-2552.

FIG. 4 shows an exemplary coder which comes within the framework of the G.711WB standardization. The input of the coder is an audio signal $S_{16}$ sampled at 16 kHz. The coder comprises a quadrature filter bank 101 separating the low band (50-7000 Hz) and the high band (4000-7000 Hz). An intermediate signal, calculated by a noise feedback loop (block 104 and 105), is drawn off from the low band (block 102). The signal is thereafter coded by a scalable PCM coder (Co-PCM) at 64 and 80 kbit/s (block 103).

The high band is coded (block 107-Co-MDCT) after modified discrete cosine transformation (MDCT) (block 106). The MDCT transformation is a transformation with 50% overlap, which requires that the signal be known in the future frame N+1 in order to code the current frame N. Thus for a G711-WB coding with 5-ms frames, the coding of the high band introduces a delay of 5 ms (termed lookahead) because of the MDCT transformation.

This delay is not, however, necessary in the low band since a scalable PCM coding is used.

The binary train T of each frame is thereafter generated by the multiplexer (block 108). This binary train may in the course of transmission to a decoder be truncated or erased.

Figure 5:
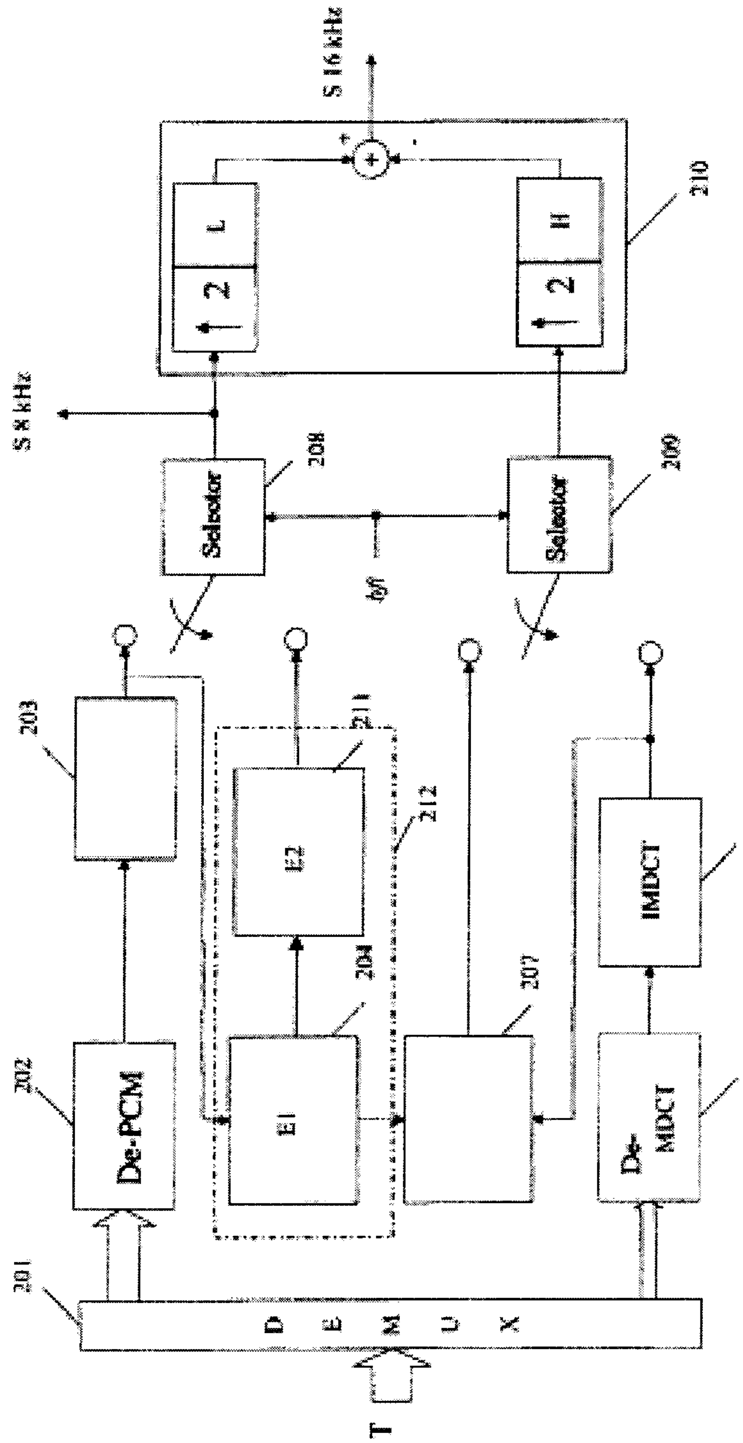
FIG. 5 illustrates a decoder of G.711 WB type implementing the second embodiment of the invention.

FIG. 5 shows a corresponding decoder implementing the method for concealing transmission errors in accordance with the invention.

Upon decoding for configurations R1 and R2*a*, after demultiplexing (block 201), the low band decoded by the scalable PCM decoder (De-PCM) (block 202) is shifted by a frame (block 203)—i.e. 5 ms. For configurations R2*b* and R3, the high band is additionally decoded (blocks 205 and 206) and the two bands are combined after selection of the appropriate branches (block 208 and 209) by the quadrature filter bank (block 210). The variable bfi (for "bad frame indicator") serves to indicate to the decoder that the current frame is erased and makes it possible to select (blocks 208 and 209) the type of decoding: normal decoding (blocks 202, 203, 205 and 206) if bfi=0 or concealment of erased frames (blocks 204, 211 and 207) if bfi=1.

The invention applies here in the case of the concealment of frames erased in the low band. Indeed, the normal decoding in the low band is of low complexity since it involves a decoding of PCM type. Distribution of the complexity of the process for concealing erased frames is then beneficial to implement.

For this purpose, the process for concealing erased frames is performed in at least two steps which are performed in different time intervals. The first step E1 is performed by preparation means implemented in the block 204 over the time interval corresponding to the erased frame and the second step is performed in the time interval corresponding to the following frame by the concealment means implemented in the block 211.

At the decoder a delay of a frame is necessary so as to temporally align the low band with the high band (block 203). This delay of a frame between low band and high band is utilized here to implement the invention in its second embodiment detailed previously with reference to FIGS. 2, 3*a* and 3*b*. It is then not necessary to introduce additional delay.

Figure 6:
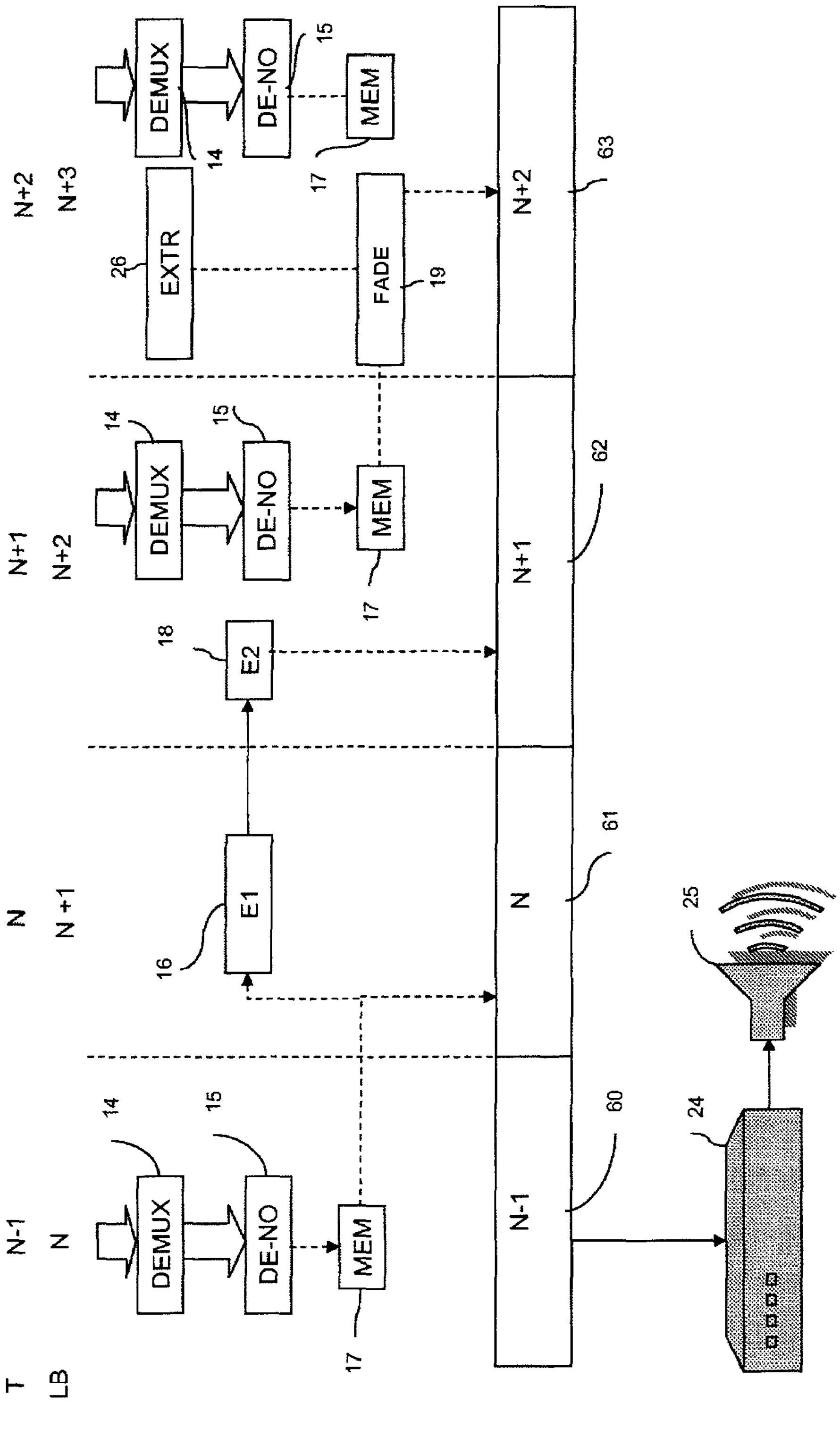
FIG. 6 illustrates the concealment method according to the invention in its second embodiment and in a decoder of G.711 WB type.

Thus, as illustrated with reference to FIG. 6, the case where the erased frame is frame N and frames N−1, N+1 and N+2 are valid is considered.

Since a delay of a frame is used at the G.711WB coder to code the high band by MDCT, the binary train T associated with frame N in fact contains the low band (LB) codes of frame N+1. In the same manner, the binary train associated with frame N−1 in fact contains the low band codes of frame N.

Upon receipt of the binary train associated with frame N−1, the low band signal of frame N is decoded and placed in buffer memory so as to be given at the same time as frame N−1 of the high band, to the filter bank 210.

The binary train associated with frame N is erased, which means to say that the low band codes of frame N+1 are not available.

Upon non-receipt of the binary train associated with the erased frame N, the first preparation step E1 is executed in the low band by taking into account the decoded and stored signal of frame N of the low band.

The sound card receives frame N of the low band placed in memory.

The binary train associated with frame N+1 is received, which means to say that the low band codes of frame N+2 are received. They are decoded and the result is placed in buffer memory. In the same time interval, the concealment step E2 (second part of the analysis and extrapolation of frame N+1) of the concealment algorithm is executed. This therefore yields the low band signal extrapolated in frame N+1 so as to dispatch it to the sound card.

The binary train associated with frame N+2 is received. The low band codes of frame N+3 are thus decoded and the decoded signal is stored. In the same time interval the algorithm for concealing erased frames continues the extrapolation for frame N+2 of the low band so as to carry out a crossfading with frame N+2 of the low band, bufferized to ensure continuity between extrapolated signal and normally decoded signal.

The present invention is not limited to an application in this type of coder/decoder. It can also be implemented according to the second embodiment in a coder/decoder of G.722 type for decoding the low band, particularly when this decoder processes frame length of 5 ms.

Figure 7:
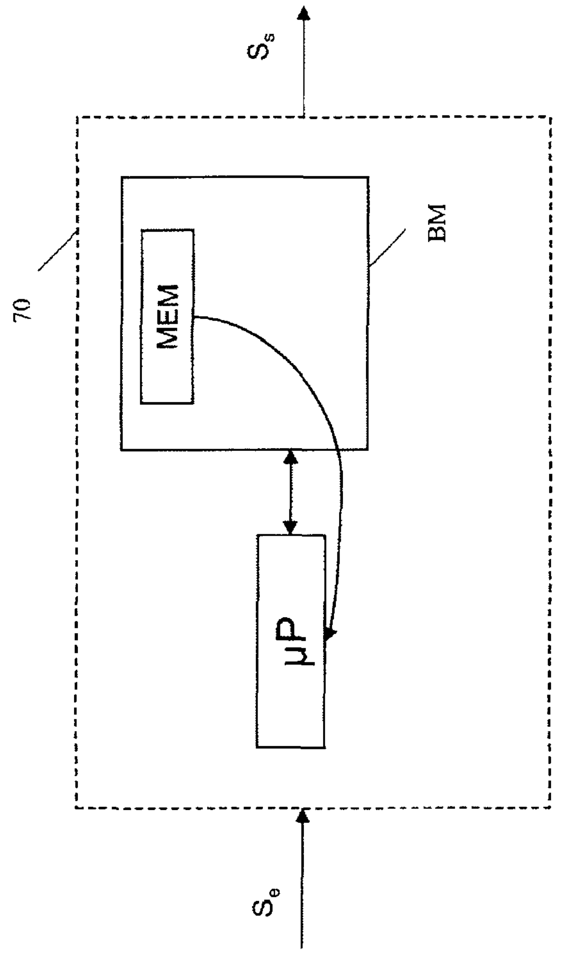
FIG. 7 illustrates a concealment device according to the invention.

The present invention is also aimed at a device 70 for transmission error concealment in a digital signal comprising, as represented at 212 in FIG. 5, preparation means 204 able to implement the first step E1, concealment means 211 able to implement the second step E2. These means are implemented in different time intervals corresponding to successive signal frames received at the input of the device. Hardware-wise, this device within the meaning of the invention typically comprises, with reference to FIG. 7, a processor μLP cooperating with a memory block BM including a storage and/or work memory, as well as an aforementioned buffer memory MEM as means for storing the frames decoded and dispatched with a temporal shift. This device receives as input successive frames of the digital signal Se and delivers the synthesized signal Ss comprising the samples of an erased frame.

The memory block BM can comprise a computer program comprising the code instructions for implementing the steps of the method according to the invention when these instructions are executed by a processor μLP of the device and in particular a first preparation step not producing any missing sample and a second concealment step producing the missing samples of the signal corresponding to the erased frame, the two steps being executed in different time intervals.

FIGS. 1 and 2 can illustrate the algorithm of such a computer program.

This concealment device according to the invention can be independent or integrated into a digital signal decoder.

The invention claimed is:

1. A method of transmission error concealment in a digital signal that is split up into a plurality of successive time frames in which, on reception, the signal can include erased frames and valid frames and in order to replace an erased frame after a valid frame, the method comprising:

a first step of preparation by comprising analyzing a valid frame to generate concealment parameters; and a second step of concealment producing missing samples of an erased frame based on the generated concealment parameters of the first step of preparation, wherein the first and second steps are performed during different time intervals, the first step being performed during a first time interval reserved for processing of a first frame and the second step being performed during a second time interval reserved for processing of a second frame.

2. The method as claimed in claim 1, wherein the first step of preparing is performed for any valid frames in anticipation of a potential erased frame and the second step of concealment is performed in the time interval reserved for processing of the erased frame.

3. The method as claimed in claim 1, wherein the first step of preparing is performed in the time interval reserved for processing of the erased frame and the second step of concealment is performed in the time interval reserved for processing of a frame following the erased frame.

4. The method as claimed in claim 3, wherein the method is implemented during decoding of a first frequency band in a decoding system comprising a decoding in a first frequency band and a decoding in a second frequency band, the decoding in the second frequency band comprising a temporal delay with respect to the decoding in the first frequency band.

5. The method as claimed in claim 4, wherein the first frequency band corresponds to the low band of a decoding of G.711WB type and the second frequency band corresponds to the high band of a decoding of G.711WB type.

6. The method as claimed in claim 1, wherein the preparation step comprises an LPC analysis step, an LTP analysis step and the concealment step comprises a step of calculating an LPC residual signal, a step of ranking and a step of extrapolating missing samples.

7. The method as claimed in claim 1, wherein the preparation step comprises an LPC analysis step, an LTP analysis step, a step of calculating an LPC residual signal and the concealment step comprises a step of ranking and a step of extrapolating missing samples.

8. A non-transitory computer readable storage medium having a computer program recorded thereon, said computer program comprising computer code instructions for implementing the steps of the method according to claim 1 when executed by a processor of a transmission error concealment device.

9. A system for transmission error concealment in a digital signal that is split up into a plurality of successive time frames in which, on reception, the signal can include erased frames and valid frames, the system comprising:

a preparation module configured to analyse a valid frame to generate concealment parameters; and a concealment module configured to generate missing samples of an erased frame based on the concealment parameters generated by the preparation module, wherein the system is configured so that the concealment parameters and missing samples are generated during different time intervals, the concealment parameters being generated during a first time interval reserved for processing of a first frame and the missing samples being generated during a second time interval reserved for processing of a second frame.

10. A digital signal decoder comprising a transmission error concealment system as claimed in claim 9.

* * * * *